(12) United States Patent
Gokurakuji et al.

(10) Patent No.: US 9,014,531 B2
(45) Date of Patent: Apr. 21, 2015

(54) TIME-SHIFTED VIEWING SYSTEM, TIME-SHIFTED VIEWING METHOD, AND TIME-SHIFTED VIEWING APPARATUS AND PROGRAM

(75) Inventors: Junichi Gokurakuji, Tokyo (JP); Shuhei Miura, Tokyo (JP); Masahiro Koike, Tokyo (JP); Masayuki Uwabo, Tokyo (JP); Takumi Okazaki, Tokyo (JP); Chihiro Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 404 days.

(21) Appl. No.: 13/143,414

(22) PCT Filed: Jan. 13, 2010

(86) PCT No.: PCT/JP2010/000150
§ 371 (c)(1),
(2), (4) Date: Jul. 6, 2011

(87) PCT Pub. No.: WO2010/082485
PCT Pub. Date: Jul. 22, 2010

(65) Prior Publication Data
US 2011/0280546 A1 Nov. 17, 2011

(30) Foreign Application Priority Data
Jan. 16, 2009 (JP) .............................. P2009-008128

(51) Int. Cl.
| | | |
|---|---|---|
| *H04N 5/765* | (2006.01) | |
| *H04N 5/931* | (2006.01) | |
| *H04N 5/782* | (2006.01) | |
| *G11B 27/10* | (2006.01) | |
| *G11B 27/32* | (2006.01) | |
| *H04N 21/433* | (2011.01) | |
| *H04N 21/472* | (2011.01) | |
| *H04N 5/775* | (2006.01) | |

(52) U.S. Cl.
CPC .............. *H04N 5/782* (2013.01); *G11B 27/105* (2013.01); *G11B 27/32* (2013.01); *H04N 5/775* (2013.01); *H04N 21/4331* (2013.01); *H04N 21/4334* (2013.01); *H04N 21/47214* (2013.01)

(58) Field of Classification Search
None
See application file for complete search history.

(56) References Cited

U.S. PATENT DOCUMENTS 7,848,618 B2 * 12/2010 Potrebic et al. ............... 386/344
8,139,924 B2 * 3/2012 Walters et al. ................ 386/328

FOREIGN PATENT DOCUMENTS

| JP | 2003199007 A | 7/2003 |
|---|---|---|
| JP | 2005198110 A | 7/2005 |
| JP | 2008109490 A | 5/2008 |
| JP | 2008271314 A | 11/2008 |
| WO | 2005117432 A | 12/2005 |

OTHER PUBLICATIONS

International Search Report for PCT/JP2010/000150 mailed Feb. 9, 2010.

* cited by examiner

*Primary Examiner* — William C Vaughn, Jr.
*Assistant Examiner* — Eileen Adams
(74) *Attorney, Agent, or Firm* — Sughrue Mion, PLLC (57) ABSTRACT

A transmitting section of the present invention initiates transmission of a second video continuously after completing transmission of a first video being transmitted, in a case that a reproduction position of the first video being transmitted is beyond an end point of the first video, when a video recording start time of a second video stored in a video storage section and a video recording end time of the first video being transmitted coincide within a predetermined time difference.

5 Claims, 8 Drawing Sheets

FIG. 8 ental Video Recorder) system has been proposed in which a video
TIME-SHIFTED VIEWING SYSTEM, TIME-SHIFTED VIEWING METHOD, AND TIME-SHIFTED VIEWING APPARATUS AND PROGRAM This application is the National Phase of PCT/JP2010/000150, filed Jan. 13, 2010, which is based upon and claims the benefit of priority from Japanese patent application No. 2009-008128, filed Jan. 16, 2009, the disclosure of which is incorporated herein in its entirety by reference.

TECHNICAL FIELD

The present invention relates to a time-shifted viewing system, a time-shifted viewing method, and a time-shifted viewing apparatus and program, which performs recording and reproduction of video.

BACKGROUND ART

Heretofore, by using a DVR (Digital Video Recorder) system or the like, it has been possible to perform time-shifted viewing whereby a television program or the like is recorded, and viewing of the program can be started even when the video recording has not been completed, viewing can be suspended temporarily while viewing the program, and viewing can be resumed later (for example refer to Patent Document 1).

Furthermore, in recent years, an nPVR (Network Personal Video Recorder) system has been proposed in which a video recording apparatus such as a server records television programs according to a user's recording requests, and a reproducing apparatus in a terminal or the like of the user reads the recorded data from the video recording apparatus via the network according to the user's viewing requests in order to perform time-shifted viewing (for example, refer to Patent Document 2).

A time-shifted viewing system such as a DVR system or an nPVR system performs time-shifted viewing by sending viewing requests to a video recording device from a reproducing device, and by the video recording device outputting video recording data corresponding to the viewing requests. The video recording device of the time-shifted viewing system generates video recording data delimited in video recording schedule units.

PRIOR ART DOCUMENT

Patent Document

[Patent Document 1] Japanese Unexamined Patent Application, First Publication No. 2008-271314
[Patent Document 2] Japanese Unexamined Patent Application, First Publication No. 2005-198110

SUMMARY OF THE INVENTION

Problem to be Solved by the Invention

However, since the video recording device of the time-shifted viewing system generates video recording data delimited in video recording schedule units, the objects for which the reproducing device performs time-shifted viewing are video recording schedule units managed by the video recording device. Therefore, the zone in which time-shifted viewing is possible is limited to a video recording schedule unit. As a result, there is a problem in that time-shifted viewing that spans video recording schedules is not possible.

In particular, in time-shifted viewing using an nPVR, at the completion of video recording data that a video recording apparatus outputs to a reproducing apparatus, video recording data ceases to be output from the video recording apparatus, and the session of the video recording apparatus and the reproducing apparatus is disconnected. Therefore, in the case where the reproducing apparatus views succeeding video recording data, the reproducing apparatus needs to output a viewing request to the video recording apparatus for each video recording schedule, and establish a session with the video recording apparatus.

For example, even in the case where an additional video recording schedule on the same channel as that of a program being viewed time-shifted is registered in the video recording apparatus during time-shifted viewing, the reproducing apparatus can only reproduce video recording data of the object for which a viewing request is made, so time-shifted viewing of video recording data of the additionally registered video recording schedule is not possible. In the case of time-shifted viewing of the video recording data of the additionally registered video recording schedule, it is necessary to make another viewing request after the session of the video recording apparatus and the reproducing apparatus has been disconnected.

The present invention has been made in view of the above-described points, and an object thereof is to provide a time-shifted viewing system, a time-shifted viewing method, and a time-shifted viewing apparatus and program, which enable time-shifted viewing that spans video recording schedules.

Means for Solving the Problem

A time-shifted viewing system according to the present invention includes a video recording apparatus that records at least first and second videos and a reproducing apparatus that reproduces at least the first and second videos, and performs time-shifted reproduction. The video recording apparatus includes: a video recording section that records the first and second videos, and registers the first and second videos in a video storage section; and a transmitting section that transmits the first and second videos recorded by the video recording section to the reproducing apparatus. The reproducing apparatus includes: a receiving section that receives the first and second videos from the video recording apparatus; and a reproducing section that reproduces the first and second videos received by the receiving section. The transmitting section initiates transmission of the second video continuously after completing transmission of the first video being transmitted, in a case that a reproduction position of the first video being transmitted is beyond an end point of the first video, when a video recording start time of the second video stored in the video storage section and a video recording end time of the first video being transmitted coincide within a predetermined time difference.

A time-shifted viewing method according to the present invention uses a time-shifted viewing system including a video recording apparatus that records at least first and second videos and a reproducing apparatus that reproduces at least the first and second videos, and performing time-shifted reproduction the time-shifted viewing method includes: recording the first and second videos, and registering the first and second videos in a video storage section by a video recording section of the video recording apparatus; transmitting to the reproducing apparatus the first and second videos recorded by the video recording section, by a transmitting section of the video recording apparatus, and initiating transmission of the second video by the transmitting section continuously after completing transmission of the first video being transmitted, in a case that a reproduction position of the first video being transmitted is beyond an end point of the first video, when a video recording start time of the second video stored in the video storage section and a video recording end time of the first video being transmitted coincide within a predetermined time difference; receiving the first and second videos from the video recording apparatus by a receiving section of the reproducing apparatus; and reproducing the video received by the receiving section by a reproducing section of the reproducing apparatus.

A time-shifted viewing apparatus according to the present invention records and reproduces at least first and second videos. The time-shifted viewing apparatus includes: a video recording section that records the first and second videos and registers the first and second videos in a video storage section; and a reproducing section that reproduces the first and second videos stored in the video storage section. The reproducing section initiates reproduction of the second video continuously after completing transmission of the first video being reproduced, in a case that a reproduction position of the first video being reproduced is beyond an end point of the first video, when a video recording start time of the second video stored in the video storage section and a video recording end time of the first video being transmitted coincide within a predetermined time difference.

A program according to the present invention operates a time-shifted viewing apparatus that records and reproduces at least first and second videos, as a video recording section that records the first and second videos and registers the first and second videos in a video storage section, and a reproducing section that reproduces the first and second videos stored in the video storage section. The reproducing section initiates reproduction of the second video continuously after completing transmission of the first video being reproduced, in the case that a reproduction position of the first video being reproduced is beyond an end point of the first video, when a video recording start time of the second video stored in the video storage section and a video recording end time of the first video being transmitted coincide within a predetermined time difference.

EFFECT OF THE INVENTION

According to the present invention, a transmitting section initiates transmission of a second video continuously after completing transmission of a first video being transmitted, in a case that a reproduction position of the first video being transmitted is beyond an end point of the first video, when a video recording start time of the second video stored in a video storage section and a video recording end time of the first video being transmitted coincide within a predetermined time difference. As a result, the time-shifted viewing system can perform time-shifted viewing that spans video recording schedules.

EXEMPLARY EMBODIMENTS FOR CARRYING OUT THE INVENTION

<First Exemplary Embodiment>

Hereunder is a detailed description of a first exemplary embodiment of the present invention with reference to the drawings.

Figure 1:
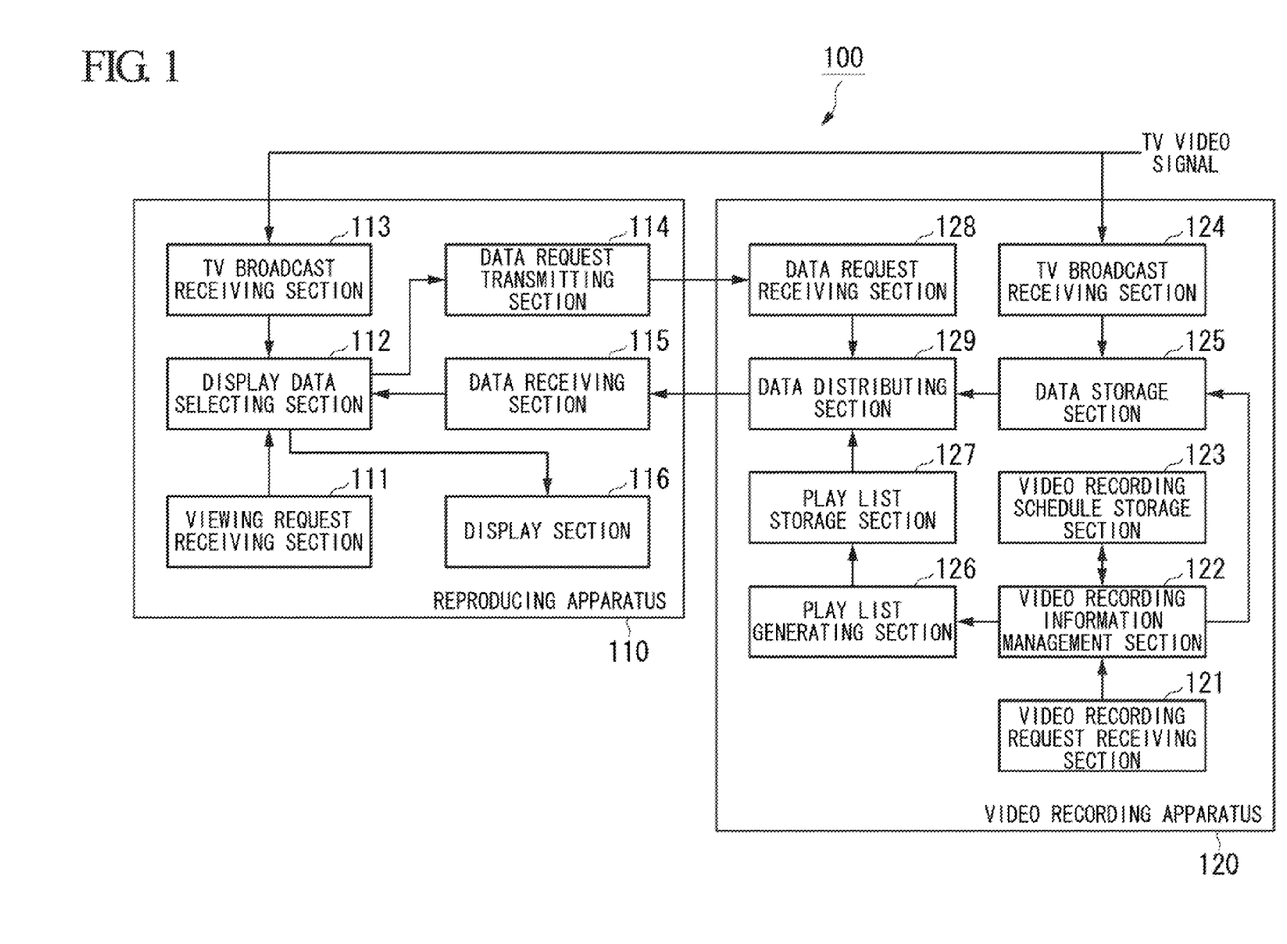
FIG. 1 is a schematic block diagram showing the structure of a time-shifted viewing system according to a first exemplary embodiment of the present invention.

FIG. 1 is a schematic block diagram showing the structure of a time-shifted viewing system according to the first exemplary embodiment of the present invention.

A time-shifted viewing system 100 includes a reproducing apparatus 110 and a video recording apparatus 120. The reproducing apparatus 110 and the video recording apparatus 120 are connected via a network or the like.

The reproducing apparatus 110 is installed in a personal computer or a special-purpose reproducing apparatus, for example, receives time-shifted data from the video recording apparatus 120, and displays the data.

The video recording apparatus 120 is installed in server equipment, for example, and records TV video.

The reproducing apparatus 110 includes a viewing request receiving section 111, a display data selecting section 112, a TV broadcast receiving section 113, a data request transmitting section 114, a data receiving section (receiving section) 115, and a display section (reproducing section) 116.

The viewing request receiving section 111 receives requests for TV viewing or time-shifted viewing from a user.

The display data selecting section 112 selects whether to display TV video or display time-shifted video on the display section 116.

The TV broadcast receiving section 113 receives TV video signals via an antenna or the like, and outputs the signals to the display data selecting section 112 continuously.

The data request transmitting section 114 transmits viewing requests for time-shifted data to the video recording apparatus 120.

The data receiving section 115 receives time-shifted data from the video recording apparatus 120.

The display section 116 displays TV video or time-shifted video.

The video recording apparatus 120 includes a video recording request receiving section 121, a video recording information management section (video recording section) 122, a video recording schedule storage section 123, a TV broadcast receiving section 124, a data storage section (video storage section) 125, a play list generating section 126, a play list storage section 127, a data request receiving section 128, and a data distributing section (transmitting section) 129.

The video recording request receiving section 121 receives inputs of requests for video recording of TV video from users or an administrator of the video recording apparatus 120. A video recording request contains at least the video recording start time, the video recording end time, and the video recording channel information.

The video recording information management section 122 registers video recording schedules in the video recording schedule storage section 123. A video recording schedule contains at least the video recording start time, the video recording end time, and the video recording channel information. The video recording information management section 122 records TV video from the video recording start time to the video recording end time, which is shown in the video recording schedule, as time-shifted data in the data storage section 125.

The TV broadcast receiving section 124 receives TV video signals via an antenna or the like, and outputs the signals as TV video to the data storage section 125 continuously.

A play list generating section 126 generates a play list of the time-shifted data that the video recording information management section 122 has recorded, and registers the play list in the play list storage section 127. The play list contains at least the video recording start time, the video recording end time, the video recording channels, and identification data of the time-shifted data of all of the time-shifted data stored in the data storage section 125.

A data request receiving section 128 receives viewing requests for time-shifted data from the reproducing apparatus 110.

A data distributing section 129 distributes time-shifted data stored in the data storage section 125 to the reproducing apparatus 110.

In such a construction, the video recording information management section 122 of the video recording apparatus 120 records TV video, and registers the recorded video in the data storage section 125. The data distributing section 129 transmits video that the video recording information management section 122 has recorded to the reproducing apparatus 110. At this time, in the case that the reproduction position of the video, which the data distributing section 129 is transmitting, is beyond the end point of the video, when there is a video whose video recording start time coincides with the video recording end time of the video being transmitted among the videos stored in the data storage section 125, the data distributing section 129 starts transmitting the video whose video recording start time coincides continuously after transmission of the video being transmitted has been completed. Moreover, the data receiving section 115 of the reproducing apparatus 110 receives video from the video recording apparatus 120. The display section 116 reproduces the video that the data receiving section 115 has received.

As a result, the time-shifted viewing system 100 performs time-shifted viewing that spans video recording schedules.

Figure 2:
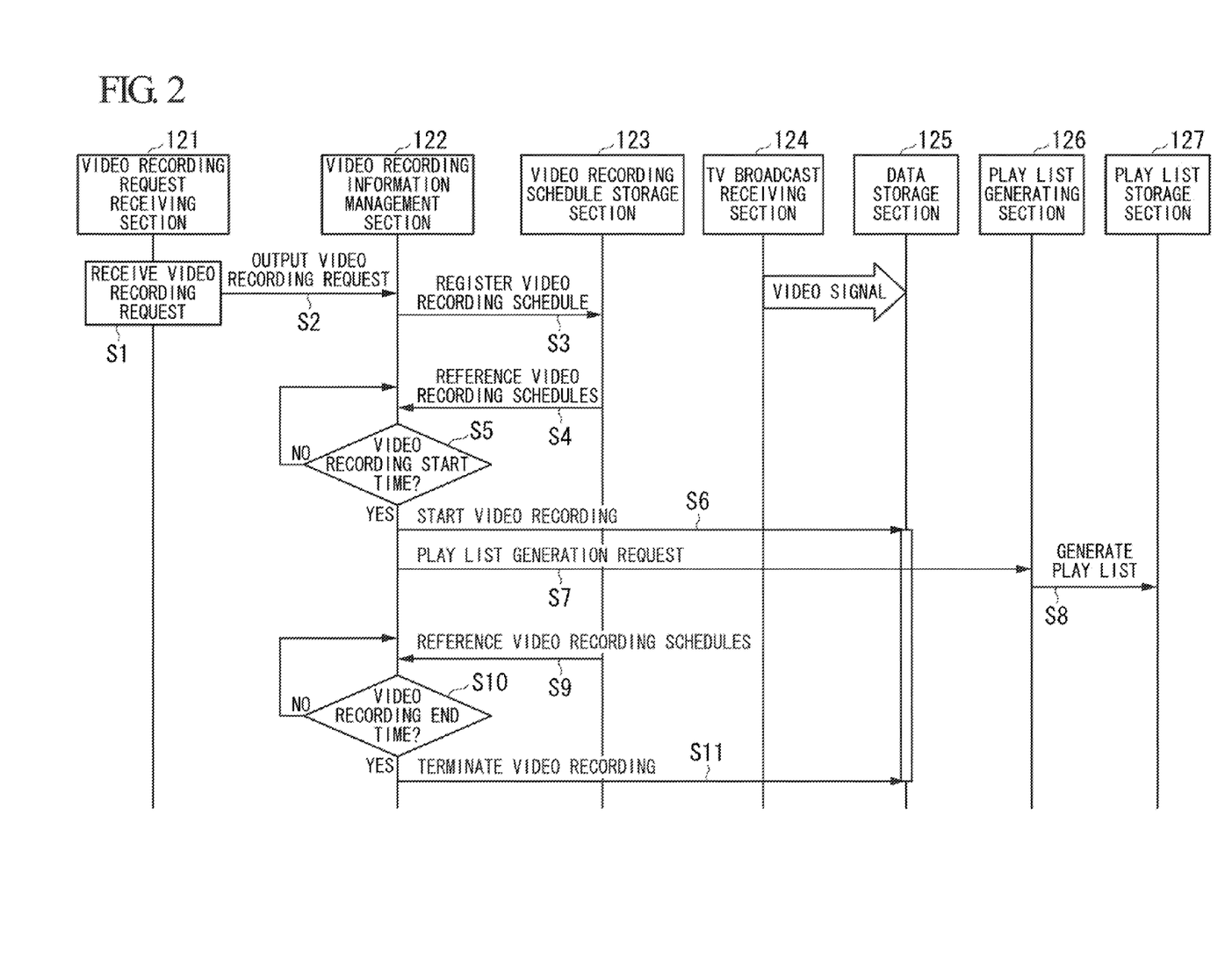
FIG. 2 is a sequence diagram showing the operation of the time-shifted viewing system according to the first exemplary embodiment of the present invention during video recording.

Next is a description of the operation of the time-shifted viewing system 100 during video recording.

FIG. 2 is a sequence diagram showing the operation of the time-shifted viewing system during video recording.

In the video recording apparatus 120, the TV broadcast receiving section 124 receives TV video signals via an antenna or the like, and outputs the TV video signals to the data storage section 125 continuously.

Firstly, when the user or the administrator of the video recording apparatus 120 inputs a video recording request to the video recording apparatus 120, the video recording request receiving section 121 receives the input video recording request (step S1). The video recording request contains at least the video recording start time, the video recording end time, and the video recording channel information, as mentioned above. When the video recording request receiving section 121 receives the input video recording request, it outputs the received input video recording request to the video recording information management section 122 (step S2). When the video recording information management section 122 obtains the video recording request from the video recording request receiving section 121, it generates a video recording schedule based on the obtained video recording request, and registers the generated video recording schedule in the video recording schedule storage section 123 (step S3). The video recording schedule contains at least the video recording start time, the video recording end time, and the video recording channel information, as mentioned above.

When the video recording information management section 122 registers the video recording schedule in the video recording schedule storage section 123, it references video recording schedules stored in the video recording schedule storage section 123 periodically (step S4). When the video recording information management section 122 references the video recording schedules stored in the video recording schedule storage section 123, it determines whether or not there is a video recording schedule in the video recording schedules whose video recording start time coincides with the current time (step S5).

In the case where the video recording information management section 122 determines that there is no video recording schedule in the video recording schedules whose video recording start time coincides with the current time (step S5: No), it returns to the processing of step S4, and references the video recording schedules periodically.

In the case where the video recording information management section 122 determines that there is a video recording schedule in the video recording schedules whose video recording start time coincides with the current time (step S5: Yes), it starts video recording of the TV video of the channel registered in the video recording schedule among the TV video signals output by the TV broadcast receiving section 124 to the data storage section 125 (step S6).

When the video recording information management section 122 starts video recording, it outputs a play list generation request to the play list generating section 126 (step S7). When the play list generating section 126 obtains the play list generation request from the video recording information management section 122, it generates play list information of the time-shifted data whose video recording has started in step S6 based on the video recording schedule, and registers the play list information in the play list storage section 127 (step S8). The play list contains at least the video recording start time, the video recording end time, the video recording channel information, and identification information of the time-shifted data, as mentioned above.

When the video recording information management section 122 outputs the play list generation request in step S7, it references the video recording schedules stored in the video recording schedule storage section 123 periodically (step S9). When the video recording information management section 122 references the video recording schedules stored in the video recording schedule storage section 123, it determines whether or not there is a video recording schedule in the video recording schedules whose video recording end time coincides with the current time (step S10).

In the case where the video recording information management section 122 determines that there is no video recording schedule in the video recording schedules whose video recording end time coincides with the current time (step S10: No), it returns to the processing of step S9, and references the video recording schedules periodically.

In the case where the video recording information management section 122 determines that there is a video recording schedule in the video recording schedules whose video recording end time coincides with the current time (step S10: Yes), it terminates video recording of the TV video to the data storage section 125 (step S11).

Figure 3:
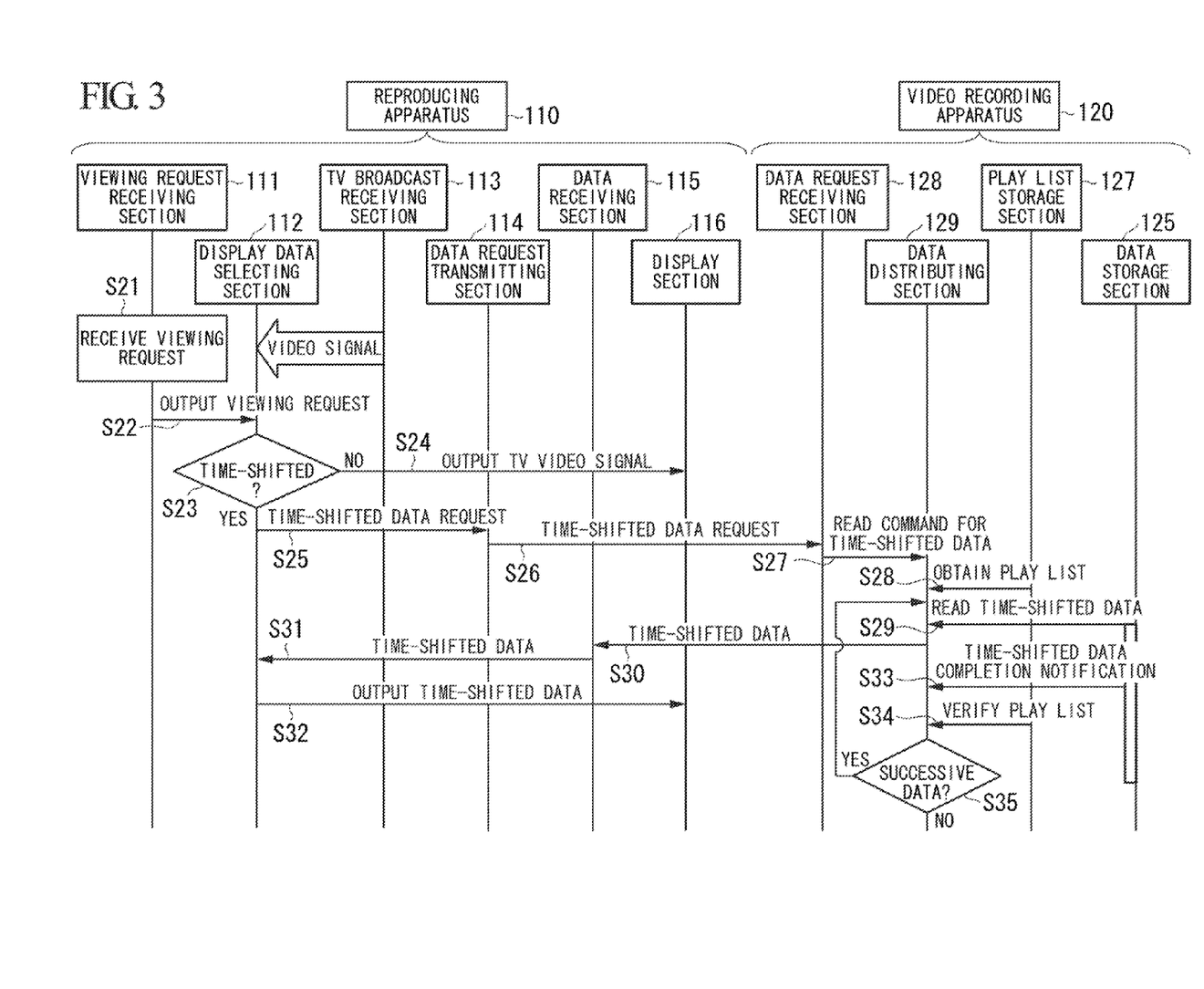
FIG. 3 is a sequence diagram showing the operation of the time-shifted viewing system according to the first exemplary embodiment of the present invention during time-shifted viewing.

Next is a description of the operation of the time-shifted viewing system 100 during time-shifted viewing.

FIG. 3 is a sequence diagram showing the operation of the time-shifted viewing system during time-shifted viewing.

In the reproducing apparatus 110, the TV broadcast receiving section 113 receives TV video signals via an antenna or the like, and outputs the TV video signals to the display data selecting section 112 continuously.

Firstly, when the user inputs a viewing request for TV video or time-shifted video to the reproducing apparatus 110, the viewing request receiving section 111 receives the input viewing request (step S21). The viewing request for TV video contains at least information of the channel to be viewed. The viewing request for the time-shifted video contains at least the video recording start time, the video recording end time, and the video recording channel information. The viewing request for time-shifted video may be performed, for example, by obtaining a play list from the data storage section 125 of the video recording apparatus 120 in advance, and specifying the time-shifted data to be viewed time-shifted from the play list.

When the viewing request receiving section 111 receives the input viewing request, it outputs the received input viewing request to the display data selecting section 112 (step S22). When the display data selecting section 112 obtains the viewing request from the viewing request receiving section 111, it determines whether or not the viewing request is a viewing request for TV video or a viewing request for time-shifted video (step S23).

In the case where the display data selecting section 112 determines that the obtained viewing request is a viewing request for TV video (step S23: No), it displays the TV video of the channel specified by the viewing request among the TV video signals output by the TV broadcast receiving section 113 on the display section 116 (step S24).

In the case where the display data selecting section 112 determines that the obtained viewing request is a viewing request for time-shifted video (step S23: Yes), it outputs the viewing request for time-shifted video (time-shifted data) to the data request transmitting section 114 (step S25). When the data request transmitting section 114 obtains the viewing request for time-shifted video from the display data selecting section 112, it transmits the viewing request for time-shifted video to the video recording apparatus 120 (step S26). At this time, the reproducing apparatus 110 establishes a session such as RTSP (Real-time Streaming Protocol) or the like between itself and the video recording apparatus 120.

When a data request receiving section 128 of the video recording apparatus 120 receives the viewing request for time-shifted video from the reproducing apparatus 110, it outputs a read command for the time-shifted data to the data distributing section 129 (step S27). When the data distributing section 129 obtains the read command for the time-shifted data from the data request receiving section 128, it obtains a play list from the play list storage section 127, and obtains identification information of the time-shifted data specified by the viewing request (step S28).

When the data distributing section 129 obtains the identification information of the time-shifted data from the play list, it reads the time-shifted data from the data storage section 125 based on the identification information (step S29). When the data distributing section 129 reads the time-shifted data, it generates a packet from the time-shifted data, and transmits the packet of time-shifted data to the reproducing apparatus 110 (step S30).

When the data receiving section 115 of the reproducing apparatus 110 receives the packet of time-shifted data from the video recording apparatus 120, it outputs the packet to the display data selecting section 112 (step S31). The display data selecting section 112 reproduces the time-shifted data based on the packet obtained from the data receiving section 115, and displays the time-shifted data on the display section 116 (step S32).

The time-shifted viewing system 100 sequentially executes the operations from step S29 to step S32 until the reproduction position of the time-shifted data reaches the end position of the time-shifted data.

When the reproduction position of the time-shifted data reaches a predetermined time before the end position of the time-shifted data, the data distributing section 129 obtains a time-shifted data completion notification from the data storage section 125 (step S33). It is determined whether or not the reproduction position of the time-shifted data is a predetermined time before the end position of the time-shifted data by comparing the time obtained by subtracting the video recording start time from the video recording end time in the play list stored in the play list storage section 127, and the time of the reproduction position.

When the data distributing section 129 obtains the time-shifted data completion notification, it obtains the play list from the play list storage section 127 (step S34).

When the data distributing section 129 obtains the play list, it determines whether or not there is time-shifted data in the play list successive to the time-shifted data being distributed (step S35). That is, it determines whether or not there is time-shifted data whose video recording channel is the same as the time-shifted data being distributed, and whose video recording start time is the same as the video recording end time of the time-shifted data being distributed.

In the case where the data distributing section 129 determines that there is time-shifted data successive to the time-shifted data being distributed (step S35: Yes), processing returns to step S29, the successive time-shifted data is read, and distribution of the successive time-shifted data starts continuously after distribution of the time-shifted data being distributed has been completed. 'To deliver the time-shifted data continuously' means to deliver using the session established in step S26 without disconnecting the session.

In the case where the data distributing section 129 determines that there is no time-shifted data successive to the time-shifted data (step S35: No), when distribution of the time-shifted data being distributed is completed, the data distributing section 129 terminates transmission of the packet. Accompanying this, the data distributing section 129 disconnects the session established in step S26.

Figure 4:
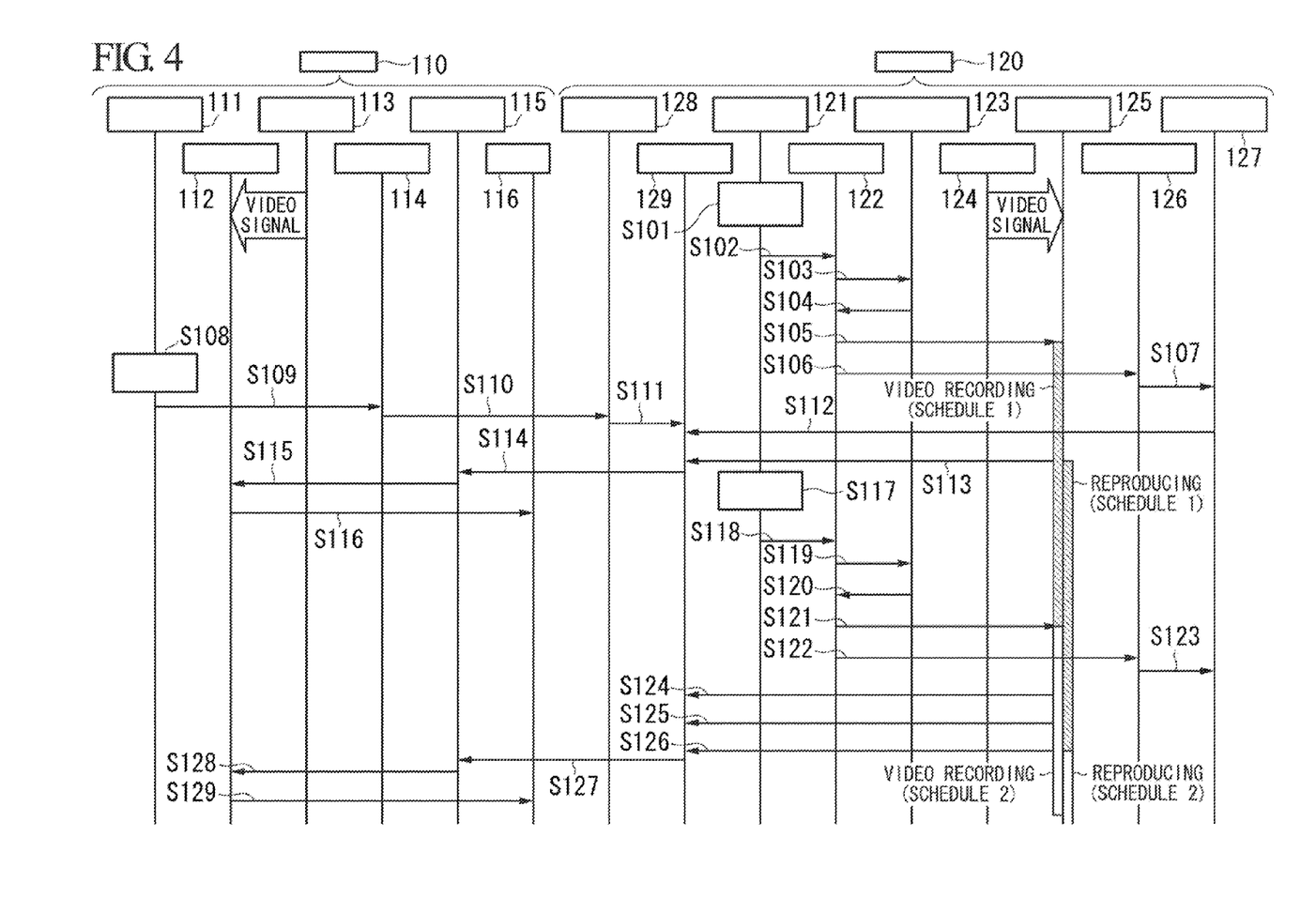
FIG. 4 is a sequence diagram showing the operation of the time-shifted viewing system according to the first exemplary embodiment of the present invention.

Next is a description of the operation of the time-shifted viewing system 100 using a specific example.

FIG. 4 is a sequence diagram showing the operation of the time-shifted viewing system 100.

Here is a description of the operation of the time-shifted viewing system 100 using the following case as an example. Firstly, an administrator of the video recording apparatus 120 inputs a video recording request for schedule 1. Next, a user inputs a time-shifted viewing request for schedule 1. During viewing of the time-shifted data of schedule 1, the administrator of the video recording apparatus 120 inputs a video recording request for schedule 2 successive to schedule 1.

In the reproducing apparatus 110, the TV broadcast receiving section 113 receives TV video signals via an antenna or the like, and outputs the TV video signals to the display data selecting section 112 continuously. Furthermore, in the video recording apparatus 120, the TV broadcast receiving section 124 receives TV video signals via an antenna or the like, and outputs the TV video signals to the data storage section 125 continuously.

Firstly, when the administrator of the video recording apparatus 120 inputs a video recording request for schedule 1 to the video recording apparatus 120, the video recording request receiving section 121 receives the input video recording request (step S101: receive video recording request). When the video recording request receiving section 121 receives the input video recording request for schedule 1, it outputs the received input video recording request to the video recording information management section 122 (step S102: output video recording request). When the video recording information management section 122 obtains the video recording request for schedule 1 from the video recording request receiving section 121, it registers a video recording schedule of schedule 1 in the video recording schedule storage section 123 (step S103: register video recording schedule). When the video recording information management section 122 registers the video recording schedule of schedule 1 in the video recording schedule storage section 123, it references the video recording schedules from the video recording schedule storage section 123 periodically, and determines whether or not there is a video recording schedule whose video recording start time is the same as the current time (step S104: reference video recording schedule).

When the current time reaches the video recording start time of schedule 1, the video recording information management section 122 starts video recording of the TV video of the channel registered in the video recording schedule of schedule 1 among the TV video signals output by the TV broadcast receiving section 124 (step S105: start video recording).

When the video recording information management section 122 starts video recording, it outputs a play list generation request to the play list generating section 126 (step S106: request play list generation). When the play list generating section 126 obtains the play list generation request from the video recording information management section 122, it generates play list information of schedule 1, and registers the play list information in the play list storage section 127 (step S107: generate play list).

When the user inputs a viewing request for time-shifted video (time-shifted data) of schedule 1 in the reproducing apparatus 110, the viewing request receiving section 111 of the reproducing apparatus 110 receives the input viewing request (step S108: receive viewing request). Here, it is assumed that at the point of time that the user inputs the viewing request, recording of schedule 1 has already started in the video recording apparatus 120, and the play list has been generated.

When the viewing request receiving section 111 receives the input viewing request for schedule 1, it outputs the viewing request to the data request transmitting section 114 via the display data selecting section 112 (step S109: output viewing request). When the data request transmitting section 114 obtains the viewing request, it transmits the viewing request for time-shifted video of schedule 1 to the video recording apparatus 120 (step S110: request for time-shifted data).

When the data request receiving section 128 of the video recording apparatus 120 receives the viewing request for time-shifted video of schedule 1 from the reproducing apparatus 110, it outputs a read command for the time-shifted data of schedule 1 to the data distributing section 129 (step S111: read command for time-shifted data). When the data distributing section 129 obtains the read command for the time-shifted data of schedule 1 from the data request receiving section 128, it obtains a play list from the play list storage section 127, and obtains identification information of the time-shifted data of schedule 1 from the play list (step S112: obtain play list).

When the data distributing section 129 obtains the identification information of the time-shifted data of schedule 1 from the play list, it reads the time-shifted data based on the identification information from the data storage section 125 (step S113: read time-shifted data). When the data distributing section 129 reads the time-shifted data of schedule 1, it generates a packet from the time-shifted data, and transmits the packet of time-shifted data to the reproducing apparatus 110 (step S114: time-shifted data).

When the data receiving section 115 of the reproducing apparatus 110 receives the packet of time-shifted data of schedule 1 from the video recording apparatus 120, it outputs the packet to the display data selecting section 112 (step S115: time-shifted data). The display data selecting section 112 reproduces the time-shifted data of schedule 1 based on the packet obtained from the data receiving section 115, and displays the time-shifted data on the display section 116 (step S116: output time-shifted data).

The time-shifted viewing system 100 sequentially executes the operations from step S113 to step S116 until the reproduction position of the time-shifted data of schedule 1 reaches the end position of the time-shifted data.

When the administrator of the video recording apparatus 120 inputs a video recording request for schedule 2 to the video recording apparatus 120 during distribution of the time-shifted data of schedule 1, the video recording request receiving section 121 receives the input video recording request (step S117: receive video recording request). When the video recording request receiving section 121 receives the input video recording request for schedule 2, it outputs the received input video recording request to the video recording information management section 122 (step S118: output video recording request). When the video recording information management section 122 obtains the video recording request for schedule from the video recording request receiving section 121, it registers the video recording schedule of schedule 2 in the video recording schedule storage section 123 (step S119: register video recording schedule). When the video recording information management section 122 registers the video recording schedule of schedule 2 in the video recording schedule storage section 123, it references the video recording schedules from the video recording schedule storage section 123 periodically, and determines whether or not there is a video recording schedule whose video recording start time is the same as the current time. Furthermore, the video recording information management section 122 determines whether or not there is a video recording schedule whose video recording end time is the same as the current time (step S120: reference video recording schedule).

When the current time reaches the video recording start time of schedule 2, the video recording information management section 122 starts video recording of the TV video on the channel registered in the video recording schedule for schedule 2 in the data storage section 125 among the TV video signals output by the TV broadcast receiving section 124. Moreover, at this time, since the current time is the same as the video recording end time of schedule 1, the video recording information management section 122 terminates video recording of the TV video of schedule 1 in the data storage section 125 (step S121: end video recording/start video recording).

When the video recording information management section 122 starts video recording of schedule 2, it outputs a play list generation request to the play list generating section 126 (step S122: request play list generation). When the play list generating section 126 obtains the play list generation request from the video recording information management section 122, it generates play list information for schedule 2, and registers it in the play list storage section 127 (step S123: generate play list).

When the reproduction position of the time-shifted data of schedule 1, which is being distributed by the data distributing section 129, reaches a predetermined time before the end position of the time-shifted data, the data distributing section 129 obtains a time-shifted data completion notification from the data storage section 125 (step S124: notify completion of time-shifted data). When the data distributing section 129 obtains the time-shifted data completion notification, it obtains the play list from the play list storage section 127, and determines whether or not there is time-shifted data in the play list successive to the time-shifted data of schedule 1 (step S125: confirm play list). At this time, since the video recording channels of schedule 1 and schedule 2 are the same, and the video recording end time of schedule 1 and the video recording start time of schedule 2 are the same, it is determined that the time-shifted data of schedule 2 is time-shifted data successive to schedule 1.

When the data distributing section 129 completes distribution of the time-shifted data of schedule 1, it obtains identification information of the time-shifted data of schedule 2 from the play list, and reads the time-shifted data of schedule 2 based on the identification information from the data storage section 125 (step S126: read time-shifted data). When the data distributing section 129 reads the time-shifted data of schedule 2, it generates a packet from the time-shifted data, and transmits the packet of time-shifted data to the reproducing apparatus 110 (step S127: time-shifted data).

When the data receiving section 115 of the reproducing apparatus 110 receives the packet of time-shifted data of schedule 2 from the video recording apparatus 120, it outputs the packet to the display data selecting section 112 (step S128: time-shifted data). The display data selecting section 112 reproduces the time-shifted data of schedule 2 based on the packet obtained from the data receiving section 115, and displays the time-shifted data on the display section 116 (step S129: output time-shifted data).

The time-shifted viewing system 100 sequentially executes the operations from step S126 to step S129 until the reproduction position of the time-shifted data of schedule 2 reaches the end position of the time-shifted data.

In this manner, according to the present exemplary embodiment, in the case that the reproduction position of time-shifted data being distributed is beyond the end position of the time-shifted data, when there is time-shifted data in the time-shifted data stored in the data storage section, whose video recording start time coincides with the video recording end time of the video being transmitted, the data distributing section 129 of the video recording apparatus 120 starts transmitting the time-shifted data whose video recording start time coincides continuously after distribution of the time-shifted data being distributed has been completed. As a result, the time-shifted viewing system 100 can perform time-shifted viewing that spans video recording schedules.

<Second Exemplary Embodiment>

Hereunder is a detailed description of a second exemplary embodiment of the present invention with reference to the drawings.

In the first exemplary embodiment of the present invention, a time-shifted viewing system is described that includes a reproducing apparatus and a video recording apparatus separately. In the second exemplary embodiment of the present invention, a time-shifted viewing apparatus will be described that includes a reproducing section and a video recording section in the same apparatus.

Figure 5:
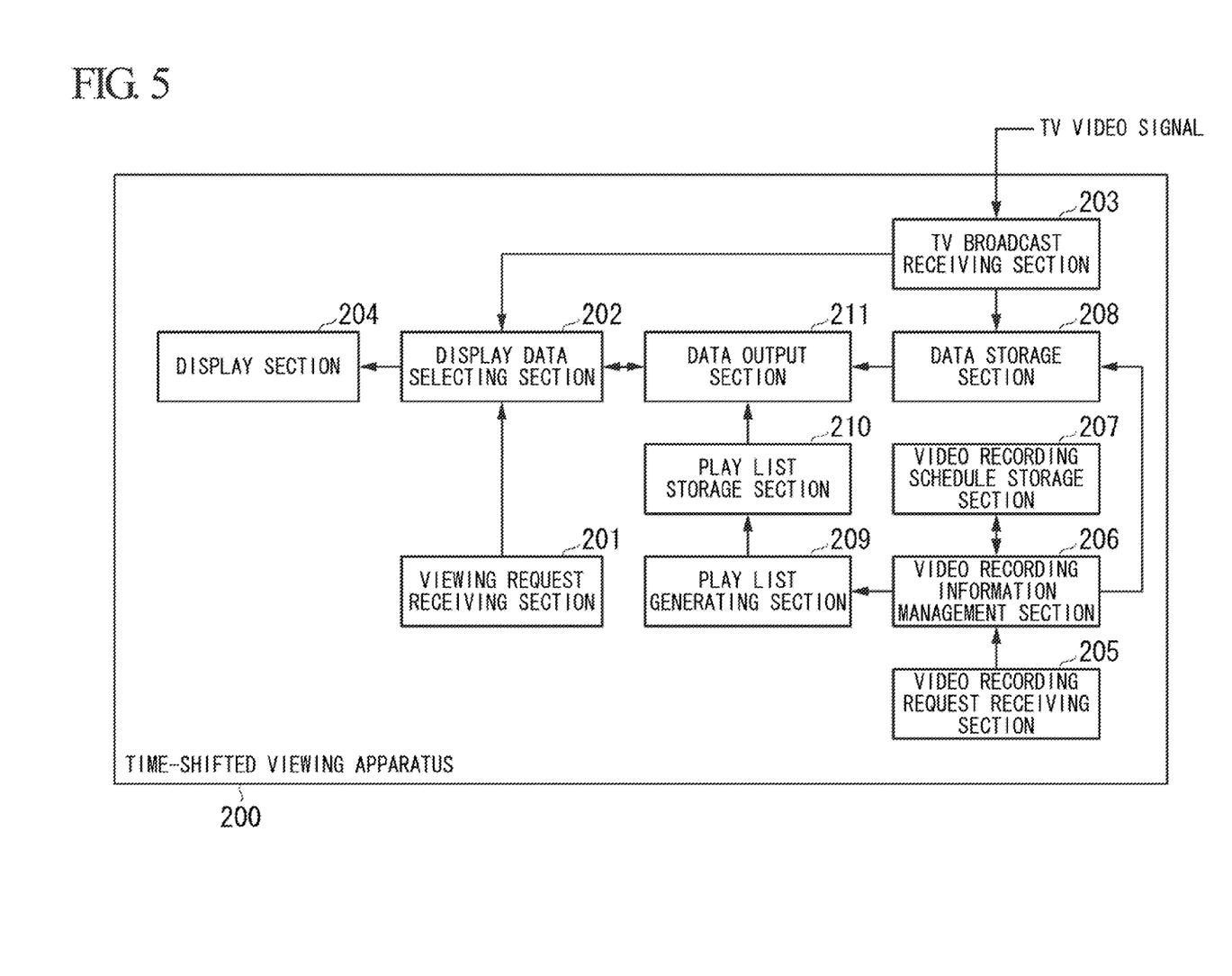
FIG. 5 is a schematic block diagram showing the structure of a time-shifted viewing apparatus according to a second exemplary embodiment of the present invention.

FIG. 5 is a schematic block diagram showing the structure of a time-shifted viewing apparatus according to the second exemplary embodiment of the present invention.

A time-shifted viewing apparatus 200 includes a viewing request receiving section 201, a display data selecting section 202, a TV broadcast receiving section 203, a display section (reproducing section) 204, a video recording request receiving section 205, a video recording information management section (video recording section) 206, a video recording schedule storage section 207, a data storage section (video storage section) 208, a play list generating section 209, a play list storage section 210, and a data output section (reproducing section) 211.

The viewing request receiving section 201 receives requests for TV viewing or time-shifted viewing from a user.

The display data selecting section 202 selects whether to display TV video or display time-shifted video on the display section 204.

The TV broadcast receiving section 203 receives TV video signals via an antenna or the like, and outputs the signals to the display data selecting section 202 and the data storage section 208 continuously.

The display section 204 displays TV video or time-shifted video.

The video recording request receiving section 205 receives inputs of requests for video recording of TV video from a user. A video recording request contains at least the video recording start time, the video recording end time, and the video recording channel information.

The video recording information management section 206 registers video recording schedules in the video recording schedule storage section 207. A video recording schedule contains at least the video recording start time, the video recording end time, and the video recording channel information. The video recording information management section 206 records TV video from the video recording start time to the video recording end time, which is shown in the video recording schedule, as time-shifted data in the data storage section 208.

The play list generating section 209 generates a play list of the time-shifted data that the video recording information management section 206 has recorded, and registers the play list in the play list storage section 210. The play list contains at least the video recording start time, the video recording end time, the video recording channel information, and identification data of the time-shifted data of all of the time-shifted data stored in the data storage section 208.

The data output section 211 outputs time-shifted data stored in the data storage section 208 to the display data selecting section 202.

In such a construction, the video recording information management section 206 of the time-shifted viewing apparatus 200 performs video recording of TV video, and registers the recorded video in the data storage section 208. The data output section 211 outputs the video recorded by the video recording information management section 206 to the display data selecting section 202. The display section 204 reproduces the video output by the data output section 211. At this time, in the case that the reproduction position of the video, which the data output section 211 is transmitting, is beyond the end point of the video, when there is a video whose video recording start time coincides with the video recording end time of the video being transmitted among the time-shifted data stored in the data storage section 208, the video whose video recording start time coincides starts to be transmitted continuously after transmission of the video being transmitted has been completed.

As a result, the time-shifted viewing system 200 performs time-shifted viewing that spans video recording schedules.

Figure 6:
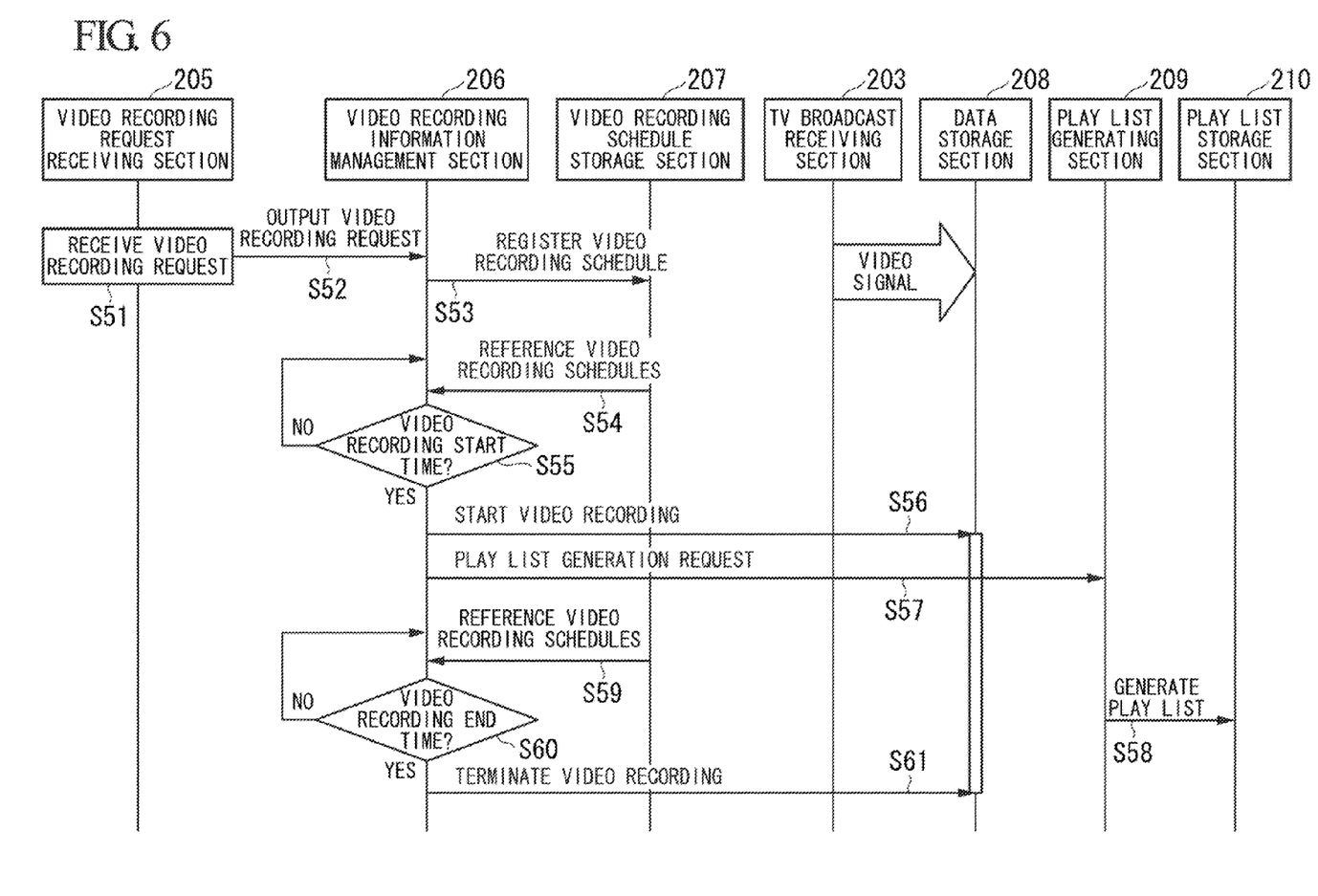
FIG. 6 is a sequence diagram showing the operation of the time-shifted viewing apparatus according to the second exemplary embodiment of the present invention during video recording.

Next is a description of the operation of the time-shifted viewing apparatus 200 during video recording.

FIG. 6 is a sequence diagram showing the operation of the time-shifted viewing apparatus during video recording.

The TV broadcast receiving section 203 of the time-shifted viewing apparatus 200 receives TV video signals via an antenna or the like, and outputs the TV video signals to the data storage section 208 continuously.

Firstly, when a user inputs a video recording request to the time-shifted viewing apparatus 200, the video recording request receiving section 205 receives the input video recording request (step S51). The video recording request contains at least the video recording start time, the video recording end time, and the video recording channel information, as mentioned above. When the video recording request receiving section 205 receives the input video recording request, it outputs the received input video recording request to the video recording information management section 206 (step S52). When the video recording information management section 206 obtains the video recording request from the video recording request receiving section 205, it generates a video recording schedule based on the obtained video recording request, and registers the generated video recording schedule in the video recording schedule storage section 207 (step S53). The video recording schedule contains at least the video recording start time, the video recording end time, and the video recording channel information, as mentioned above.

When the video recording information management section 206 registers the video recording schedule in the video recording schedule storage section 207, it references video recording schedules stored in the video recording schedule storage section 207 periodically (step S54). When the video recording information management section 206 references the video recording schedules stored in the video recording schedule storage section 207, it determines whether or not there is a video recording schedule in the video recording schedules whose video recording start time coincides with the current time (step S55).

In the case where the video recording information management section 206 determines that there is no video recording schedule in the video recording schedules whose video recording start time coincides with the current time (step S55: No), it returns to the processing of step S54, and references the video recording schedules periodically.

In the case where the video recording information management section 206 determines that there is a video recording schedule in the video recording schedules whose video recording start time coincides with the current time (step S55: Yes), it starts video recording of the TV video of the channel registered in the video recording schedule among the TV video signals output by the TV broadcast receiving section 203, to the data storage section 208 (step S56).

When the video recording information management section 206 starts video recording, it outputs a play list generation request to the play list generating section 209 (step S57). When the play list generating section 209 obtains the play list generation request from the video recording information management section 206, it generates play list information of the time-shifted data whose video recording has started in step S56 based on the video recording schedule, and registers the play list information in the play list storage section 210 (step S58). The play list contains at least the video recording start time, the video recording end time, the video recording channel information, and identification information of the time-shifted data, as mentioned above.

When the video recording information management section 206 outputs the play list generation request in step S57, it references the video recording schedules stored in the video recording schedule storage section 207 periodically (step S59). When the video recording information management section 206 references the video recording schedules stored in the video recording schedule storage section 207, it determines whether or not there is a video recording schedule in the video recording schedules whose video recording end time coincides with the current time (step S60).

In the case where the video recording information management section 206 determines that there is no video recording schedule in the video recording schedules whose video recording end time coincides with the current time (step S60: No), it returns to the processing of step S59, and references the video recording schedules periodically.

In the case where the video recording information management section 206 determines that there is a video recording schedule in the video recording schedules whose video recording end time coincides with the current time (step S60: Yes), it terminates video recording of the TV video to the data storage section 208 (step S61).

Figure 7:
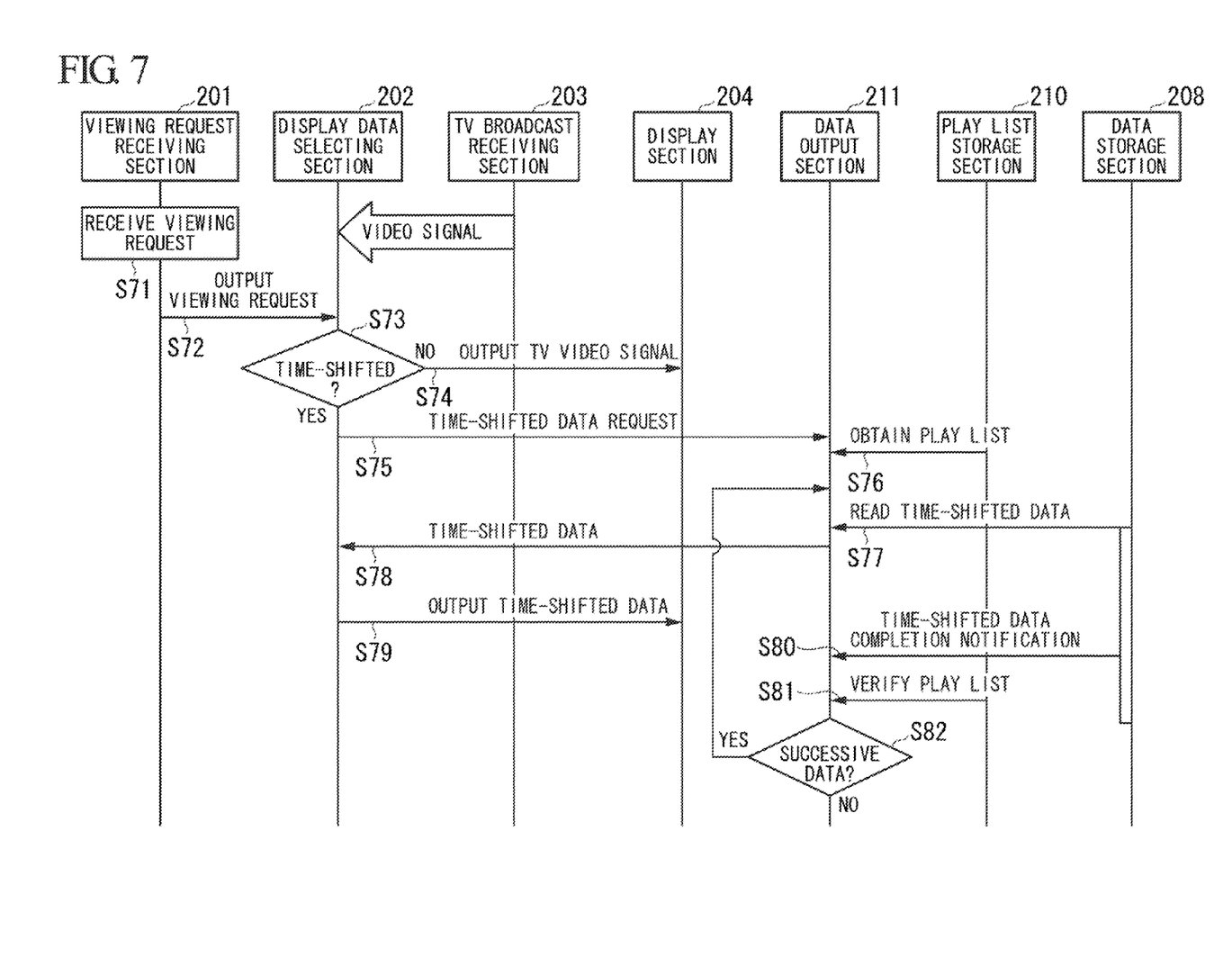
FIG. 7 is a sequence diagram showing the operation of the time-shifted viewing apparatus according to the second exemplary embodiment of the present invention during time-shifted viewing.

Next is a description of the operation of the time-shifted viewing apparatus 200 during time-shifted viewing.

FIG. 7 is a sequence diagram showing the operation of the time-shifted viewing apparatus during time-shifted viewing.

The TV broadcast receiving section 203 of the time-shifted viewing apparatus 200 receives TV video signals via an antenna or the like, and outputs the TV video signals to the display data selecting section 202 continuously.

Firstly, when a user inputs a viewing request for TV video or time-shifted video to the time-shifted viewing apparatus 200, the viewing request receiving section 201 receives the input viewing request (step S71). The viewing request for TV video contains at least information of the channel to be viewed. The viewing request for the time-shifted video contains at least the video recording start time, the video recording end time, and the video recording channel information. The viewing request for time-shifted video may be performed, for example, by obtaining a play list from the data storage section 211 in advance, and specifying the time-shifted data to be viewed time-shifted from the play list.

When the viewing request receiving section 201 receives the input viewing request, it outputs the received input viewing request to the display data selecting section 202 (step S72). When the display data selecting section 202 obtains the viewing request from the viewing request receiving section, it determines whether the viewing request is a viewing request for TV video or a viewing request for time-shifted video (step S73).

In the case where the display data selecting section 202 determines that the obtained viewing request is a viewing request for TV video (step S73: No), it displays the TV video of the channel specified by the viewing request among the TV video signals output by the TV broadcast receiving section 203 on the display section 204 (step S74).

In the case where the display data selecting section 202 determines that the obtained viewing request is a viewing request for time-shifted video (step S73: Yes), it outputs the viewing request for time-shifted video to the data output section 211 (step S75). When the data output section 211 obtains the viewing request for time-shifted video from the display data selecting section 202, it obtains a play list from the play list storage section 210, and obtains identification information of the time-shifted data specified by the viewing request from the play list (step S76).

When the data distributing section 211 obtains identification information of the time-shifted data from the play list, it reads the time-shifted data from the data storage section 208 based on the identification information (step S77). When the data distributing section 211 reads the time-shifted data, it outputs the time-shifted data to the display data selecting section 202 (step S78).

The display data selecting section 202 reproduces the time-shifted data based on a packet obtained from the data output section 211, and displays the time-shifted data on the display section 204 (step S79).

The time-shifted viewing apparatus 200 sequentially executes the operations from step S77 to step S79 until the reproduction position of the time-shifted data reaches the end position of the time-shifted data.

When the reproduction position of the time-shifted data reaches a predetermined time before the end position of the time-shifted data, the data output section 211 obtains a time-shifted data completion notification from the data storage section 208 (step S80). It is determined whether or not the reproduction position of the time-shifted data is a predetermined time before the end position of the time-shifted data by comparing the time obtained by subtracting the video recording start time from the video recording end time in the play list stored in the play list storage section 210, and the time of the reproduction position, for example.

When the data output section 211 obtains the time-shifted data completion notification, it obtains the play list from the play list storage section 210 (step S81). When the data output section 211 obtains the play list, it determines whether or not there is time-shifted data in the play list successive to the time-shifted data being distributed (step S82). That is, the data output section 211 determines whether or not there is time-shifted data whose video recording channel is the same as the time-shifted data being distributed, and whose video recording start time is the same as the video recording end time of the time-shifted data being distributed.

In the case where the data output section 211 determines that there is time-shifted data successive to the time-shifted data being distributed (step S82: Yes), it returns to step S77, reads the successive time-shifted data, and starts distribution of the successive time-shifted data continuously after distribution of the time-shifted data being distributed has been completed.

In the case where the data output section 211 determines that there is no time-shifted data successive to the time-shifted data being distributed (step S35: No), when distribution of the time-shifted data being distributed is completed, the data output section 211 terminates transmission of the time-shifted data.

Figure 8:
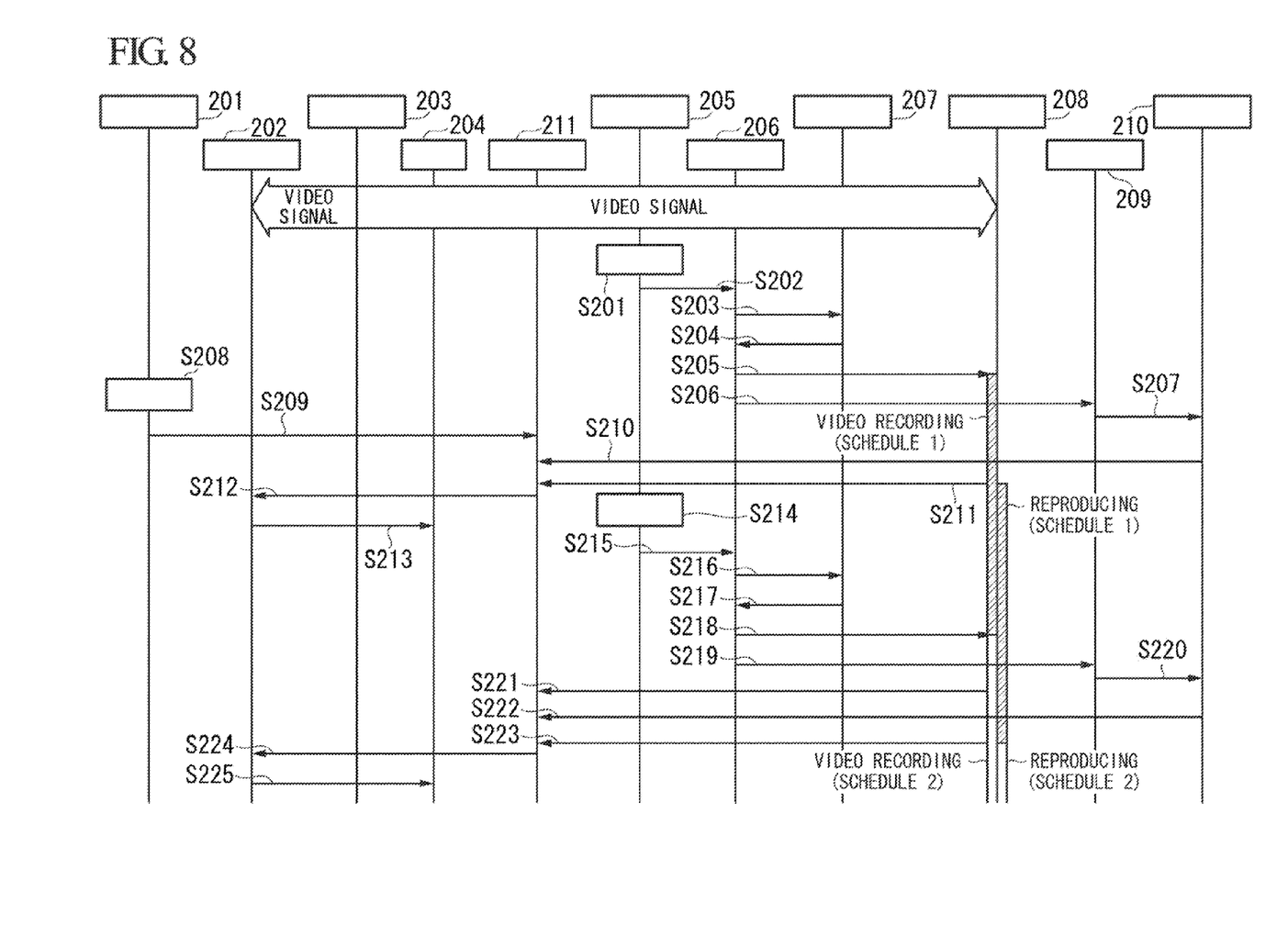
FIG. 8 is a sequence diagram showing the operation of the time-shifted viewing apparatus according to the second exemplary embodiment of the present invention.

Next is a description of the operation of the time-shifted viewing apparatus 200 using a specific example.

FIG. 8 is a sequence diagram showing the operation of the time-shifted viewing apparatus.

Here is a description of the operation of the time-shifted viewing apparatus 200 using the following case as an example. Firstly, a user inputs a video recording request for schedule 1. Next, a user inputs a time-shifted viewing request for schedule 1. During viewing of the time-shifted data of schedule 1, the user inputs a video recording request for schedule 2 successive to schedule 1.

In the time-shifted viewing apparatus 200, the TV broadcast receiving section 203 receives TV video signals via an antenna or the like, and outputs the TV video signals to the display data selecting section 202 and the data storage section 208 continuously.

Firstly, when the user inputs a video recording request for schedule 1 to the time-shifted viewing apparatus 200, the video recording request receiving section 205 receives the input video recording request (step S201: receive video recording request). When the video recording request receiving section 205 receives the input video recording request for schedule 1, it outputs the received input video recording request to the video recording information management section 206 (step S202: output video recording request). When the video recording information management section 206 obtains the video recording request for schedule 1 from the video recording request receiving section 205, it registers the video recording schedule of schedule 1 in the video recording schedule storage section 207 (step S203: register video recording schedule). When the video recording information management section 206 registers the video recording schedule of schedule 1 in the video recording schedule storage section 207, it references the video recording schedules from the video recording schedule storage section 207 periodically, and determines whether or not there is a video recording schedule whose video recording start time is the same as the current time (step S204: reference video recording schedule).

When the current time reaches the video recording start time of schedule 1, the video recording information management section 206 starts video recording of the TV video of the channel registered in the video recording schedule of schedule 1 among the TV video signals output by the TV broadcast receiving section 203 (step S205: start video recording).

When the video recording information management section 206 starts video recording, it outputs a play list generation request to the play list generating section 209 (step S206: request play list generation). When the play list generating section 209 obtains the play list generation request from the video recording information management section 206, it generates play list information of schedule 1, and registers the play list information in the play list storage section 210 (step S207: generate play list).

When the user inputs a viewing request for time-shifted video of schedule 1 in the time-shifted viewing apparatus 200, the viewing request receiving section 201 of the time-shifted viewing apparatus 200 receives the input viewing request (step S208: receive viewing request). Here, it is assumed that at the point of time that the user inputs the viewing request, recording of schedule 1 has already started, and the play list has been generated.

When the viewing request receiving section 201 receives the input viewing request for schedule 1, it outputs the viewing request to the data output section 211 via the display data selecting section 202 (step S209: output viewing request). When the data output section 211 obtains the viewing request for schedule 1, it obtains a play list from the play list storage section 127, and obtains identification information of the time-shifted data of schedule 1 from the play list (step S210: obtain play list).

When the data output section 211 obtains the identification information of the time-shifted data of schedule 1 from the play list, it reads the time-shifted data based on the identification information from the data storage section 208 (step S211: read time-shifted data). When the data output section 211 reads the time-shifted data of schedule 1, it outputs the time-shifted data to the display data selecting section 202 (step S212: time-shifted data). The display data selecting section 202 reproduces the time-shifted data of schedule 1 obtained from the data output section 211, and displays the time-shifted data on the display section 204 (step S213: output time-shifted data).

The time-shifted viewing system 200 sequentially executes the operations from step S211 to step S213 until the reproduction position of the time-shifted data of schedule 1 reaches the end position of the time-shifted data.

When a user inputs a video recording request for schedule 2 to the time-shifted viewing apparatus 200 during distribution of the time-shifted data of schedule 1, the video recording request receiving section 205 receives the input video recording request (step S214: receive video recording request). When the video recording request receiving section 205 receives the input video recording request for schedule 2, it outputs the received input video recording request to the video recording information management section 206 (step S215: output video recording request). When the video recording information management section 206 obtains the video recording request for schedule 2 from the video recording request receiving section 205, it registers the video recording schedule of schedule 2 in the video recording schedule storage section 207 (step S216: register video recording schedule). When the video recording information management section 206 registers the video recording schedule of schedule 2 in the video recording schedule storage section 207, it references the video recording schedules from the video recording schedule storage section 207 periodically, and determines whether or not there is a video recording schedule whose video recording start time is the same as the current time. Furthermore, the video recording information management section 206 determines whether or not there is a video recording schedule whose video recording end time is the same as the current time (step S217: reference video recording schedule).

When the current time reaches the video recording start time of schedule 2, the video recording information management section 206 starts video recording of the TV video on the channel registered in the video recording schedules for schedule 2 in the data storage section 208 among the TV video signals output by the TV broadcast receiving section 203. Moreover, at this time, since the current time is the same as the video recording end time of schedule 1, the video recording information management section 206 terminates video recording of the TV video of schedule 1 in the data storage section 208 (step S218: end video recording/start video recording).

When the video recording information management section 206 starts video recording of schedule 2, it outputs a play list generation request to the play list generating section 209 (step S219: request play list generation). When the play list generating section 209 obtains the play list generation request from the video recording information management section 206, it generates play list information for schedule 2, and registers the play list information in the play list storage section 210 (step S220: generate play list).

When the reproduction position of the time-shifted data of schedule 1, which is being distributed by the data output section 211, reaches a predetermined time before the end position of the time-shifted data, the data output section 211 obtains a time-shifted data completion notification from the data storage section 208 (step S221: notify completion of time-shifted data). When the data output section 211 obtains the time-shifted data completion notification, it obtains the play list from the play list storage section 210, and determines whether or not there is time-shifted data in the play list successive to the time-shifted data of schedule 1 (step S222: confirm play list). At this time, since the video recording channels of schedule 1 and schedule 2 are the same, and the video recording end time of schedule 1 and the video recording start time of schedule 2 are the same, it is determined that the time-shifted data of schedule 2 is time-shifted data successive to schedule 1.

When the data output section 211 completes distribution of the time-shifted data of schedule 1, it obtains identification information of the time-shifted data of schedule 2 from the play list, and reads the time-shifted data of schedule 2 based on the identification information from the data storage section 208 (step S223: read time-shifted data). When the data output section 211 reads the time-shifted data of schedule 2, it outputs the time-shifted data to the display data selecting section 202 (step S224: time-shifted data).

The display data selecting section 202 reproduces the time-shifted data of schedule 2 obtained from the data output section 211, and displays the time-shifted data on the display section 204 (step S225: output time-shifted data).

The time-shifted viewing apparatus 200 sequentially executes the operations from step S223 to step S225 until the reproduction position of the time-shifted data of schedule 2 reaches the end position of the time-shifted data.

In this manner, according to the present exemplary embodiment, in the case that the reproduction position of time-shifted data being distributed is beyond the end position of the time-shifted data, when there is time-shifted data in the time-shifted data stored in the data storage section, whose video recording start time coincides with the video recording end time of the video being transmitted, the data output section 211 of the time-shifted viewing apparatus 200 starts transmitting the time-shifted data whose video recording start time coincides continuously after distribution of the time-shifted data being distributed has been completed. As a result, the time-shifted viewing apparatus 200 can perform time-shifted viewing that spans video recording schedules.

Exemplary embodiments of this invention are described above in detail with reference to the drawings. However, the specific structure is not limited to the exemplary embodiments. Various design changes and the like are possible provided they do not depart from the gist of this invention.

For example, in the above-described exemplary embodiments, examples are described in which the reproducing apparatus 110 according to the first exemplary embodiment and the time-shifted viewing apparatus 200 according to the second exemplary embodiment include a display data selecting section 112, and can selectively display either TV video or time-shifted video. However, this is not a limitation, and the reproducing apparatus 110 or the time-shifted viewing apparatus 200 may be apparatus dedicated to the reproduction of time-shifted video without a display data selecting section 112.

In the above-described exemplary embodiments, examples are described in which, when there is time-shifted data in the time-shifted data stored in the data storage section whose video recording start time coincides with the video recording end time of the video being transmitted, the data distributing section 129 of the video recording apparatus 120 according to the first exemplary embodiment and the data output section 211 of the time-shifted viewing apparatus 200 according to the second exemplary embodiment start transmitting the time-shifted data whose video recording start time coincides continuously after distribution of the time-shifted data being distributed has been completed. However, this is not a limitation. For example, in the case where there is time-shifted data among the time-shifted data stored in the data storage section whose video recording start time coincides with the video recording end time of the time-shifted data being distributed within a predetermined time difference (for example ten minutes difference), transmission of the time-shifted data whose video recording start time coincides within the predetermined time difference may be started continuously after distribution of the time-shifted data being distributed has been completed.

Furthermore, in the above-described exemplary embodiments, examples are described in which in the case of reproducing time-shifted data, consecutive time-shifted data is reproduced. However, this is not a limitation. For example, a case will be described in which second time-shifted data having a video recording start time that coincides with the video recording end time of the first time-shifted data is reproduced continuously after the first time-shifted data (the video recording start time of the second time-shifted data may coincide with the video recording end time of the first time-shifted data within a predetermined time difference). In this case, even in the case where the second time-shifted data is rewound for reproduction, the immediate prior first time-shifted data may be rewound for continuous reproduction. To be specific, in the case where the reproduction position of the video being transmitted is beyond the start point of the video by rewinding for reproduction, in the case where there is time-shifted data among the time-shifted data stored in the data storage section, whose video recording end time coincides with the video recording start time of the time-shifted data being transmitted (or time-shifted data whose video recording end time coincides with the video recording start time of the time-shifted data currently being transmitted within a predetermined time difference), the data distributing section 129 of the video recording apparatus 120 according to the first exemplary embodiment and the data output section 211 of the time-shifted viewing apparatus 200 according to the second exemplary embodiment may start transmission of the time-shifted data whose video recording end time coincides continuously after distribution of the time-shifted data being distributed has been completed.

The abovementioned video recording apparatus and reproducing apparatus according to the first exemplary embodiment of the present invention and the time-shifted viewing apparatus according to the second exemplary embodiment of the present invention have computer systems inside. The operation of each of the above-described processing sections is stored in a computer readable recording medium in the form of a program, and the above processing can be performed by the computer reading the program and executing it. Here, the computer readable recording medium represents a magnetic disk, a magneto optical disk, a CD-ROM, a DVD-ROM, a semiconductor memory, or the like. Moreover, the arrangement may be such that this computer program is distributed to the computers by a communication circuit, and the computer that receives this distribution executes the program.

Furthermore, the above-described program may realize some of the functions described above. Moreover, it may be so-called differential files (differential programs) in which the above-described functions can be realized by a combination of programs that have already been stored in the computer system.

INDUSTRIAL APPLICABILITY

The present invention can be used for a time-shifted viewing system, a time-shifted viewing method, and a time-shifted viewing apparatus and program. According to this time-shifted viewing system, time-shifted viewing method, time-shifted viewing apparatus and program, it is possible to perform time-shifted viewing that spans video recording schedules.

REFERENCE SYMBOLS

100 Time-shifted viewing system
110 Reproducing apparatus
111 Viewing request receiving section
112 Display data selecting section
113 TV broadcast receiving section
114 Data request transmitting section
115 Data receiving section
116 Display section
120 Video recording apparatus
121 Video recording request receiving section
122 Video recording information management section
123 Video recording schedule storage section
124 TV broadcast receiving section
125 Data storage section
126 Play list generating section
127 Play list storage section
128 Data request receiving section
129 Data distributing section
200 Time-shifted viewing apparatus
201 Viewing request receiving section
202 Display data selecting section
203 TV broadcast receiving section
204 Display section
205 Video recording request receiving section
206 Video recording information management section
207 Video recording schedule storage section
208 Data storage section
209 Play list generating section
210 Play list storage section
211 Data output section

The invention claimed is:

1. A time-shifted viewing system comprising a video recording apparatus that records at least first and second videos and a reproducing apparatus that reproduces at least the first and second videos, and performing time-shifted reproduction,
the video recording apparatus including:
a video recording section that records the first and second videos, and registers the first and second videos in a video storage section; and
a transmitting section that transmits the first and second videos recorded by the video recording section to the reproducing apparatus,
the reproducing apparatus including:
a receiving section that receives the first and second videos from the video recording apparatus; and
a reproducing section that reproduces the first and second videos received by the receiving section,
the transmitting section determining whether to transmit the second video by determining whether a video recording channel of the second video is the same as a video recording channel of the first video and determining whether a video recording start time of the second video and a video recording end time of the first video coincide with each other within a predetermined time difference, the transmitting section initiating transmission of the second video stored in the video storage section continuously after completing transmission of the first video being transmitted, in a case that a reproduction position of the first video being transmitted is beyond an end point of the first video, when the transmitting section has determined that the video recording channel of the second video is the same as the video recording channel of the first video and the video recording start time of the second video and the video recording end time of the first video coincide with each other within the predetermined time difference.

2. The time-shifted viewing system according to claim 1, wherein the video recording channel of the second video is the same as the video recording channel of the first video, and the video recording start time of the second video coincides with the video recording end time of the first video within the predetermined time difference, and the transmitting section initiates the transmission of the second video continuously after completing the transmission of the first video, when the reproduction position of the first video is beyond the end point of the first video, during the transmission of the first video to the reproducing apparatus.

3. The time-shifted viewing system according to claim 1, wherein the transmitting section initiates transmission of the first video stored in the video storage section continuously after completing transmission of the second video being transmitted, in a case that a reproduction position of the second video being transmitted is beyond a start point of the second video by rewinding for reproduction, when the transmitting section has determined that the video recording channel of the first video is the same as the video recording channel of the second video and the video recording end time of the first video and the video recording start time of the second video coincide with each other within the predetermined time difference.

4. A time-shifted viewing method for a time-shifted viewing system comprising a video recording apparatus and a reproducing apparatus, the method comprising:
recording first and second videos,
registering the first and second videos in a video storage section;
transmitting to the reproducing apparatus the first video;
determining whether to transmit the second video by determining whether a video recording channel of the second video is the same as a video recording channel of the first video and determining whether a video recording start time of the second video and a video recording end time of the first video coincide with each other within a predetermined time difference;
initiating transmission of the second video stored in the video storage section continuously after completing transmission of the first video being transmitted, in a case that a reproduction position of the first video being transmitted is beyond an end point of the first video, when it has been determined that the video recording channel of the second video is the same as the video recording channel of the first video and the video recording start time of the second video and the video recording end time of the first video coincide with each other within the predetermined time difference.

5. A time-shifted viewing apparatus that records and reproduces at least first and second videos, comprising:
a video recording section that records the first and second videos and registers the first and second videos in a video storage section; and
a reproducing section that reproduces the first and second videos stored in the video storage section,
the reproducing section determining whether to reproduce the second video by determining whether a video recording channel of the second video is the same as a video recording channel of the first video and determining whether a video recording start time of the second video and a video recording end time of the first video coincide with each other within a predetermined time difference,
the reproducing section initiating reproduction of the second video stored in the video storage section continuously after completing reproduction of the first video, in a case that a reproduction position of the first video is beyond an end point of the first video, when the reproducing section has determined that the video recording channel of the second video is the same as the video recording channel of the first video and the video recording start time of the second video and the video recording end time of the first video coincide with each other within the predetermined time difference.

* * * * *